United States Patent
Previero

(10) Patent No.: US 9,827,693 B2
(45) Date of Patent: Nov. 28, 2017

(54) PLANT AND METHOD FOR SEPARATING LABELS AND OTHER MATERIALS FROM PLASTIC BOTTLES

(71) Applicant: PREVIERO N. S.R.L., Anzano del Parco (IT)

(72) Inventor: Flavio Previero, Anzano del Parco (IT)

(73) Assignee: PREVIERO N. S.R.L., Anzano del Parco (IT)

( * ) Notice: Subject to any disclaimer, the term of this patent is extended or adjusted under 35 U.S.C. 154(b) by 88 days.

(21) Appl. No.: 14/893,453

(22) PCT Filed: May 23, 2014

(86) PCT No.: PCT/EP2014/060736
§ 371 (c)(1),
(2) Date: Nov. 23, 2015

(87) PCT Pub. No.: WO2014/187992
PCT Pub. Date: Nov. 27, 2014

(65) Prior Publication Data
US 2016/0158966 A1    Jun. 9, 2016

(30) Foreign Application Priority Data

May 24, 2013   (IT) .................... MI13A0849

(51) Int. Cl.
*B07B 9/00* (2006.01)
*B29B 17/02* (2006.01)
(Continued)

(52) U.S. Cl.
CPC ............ *B29B 17/02* (2013.01); *B07B 9/00* (2013.01); *B07B 11/04* (2013.01); *B07B 7/01* (2013.01);
(Continued)

(58) Field of Classification Search
CPC .. B07B 7/01; B07B 9/00; B07B 11/04; B07B 11/06; B07B 2200/02; B29B 2017/0234; B29B 2017/0241; B29L 2031/7158
See application file for complete search history.

(56) References Cited

U.S. PATENT DOCUMENTS 2,236,548 A * 4/1941 Prouty ............... B02C 17/189
                                                131/302
3,729,096 A * 4/1973 Fitzner ................ B07B 1/22
                                                209/296
(Continued)

FOREIGN PATENT DOCUMENTS

CN   101596754 A   12/2009
DE   10002682 A1   8/2001
(Continued)

OTHER PUBLICATIONS

International Search Report & Written Opinion of the International Searching Authority Application No. PCT/EP2014/060736 dated Jul. 23, 2014;Mailing Date: Aug. 20, 2014 11 pages.

*Primary Examiner* — Joseph C Rodriguez
(74) *Attorney, Agent, or Firm* — Whitmyer IP Group LLC

(57) ABSTRACT

A plant and a method for separating labels, caps and other contaminating materials from containers and bottles made of plastics, in particular bottles made of PET, in the field of treating and recycling plastics.

20 Claims, 4 Drawing Sheets

(51) Int. Cl.
  *B07B 11/04*   (2006.01)
  *B07B 7/01*   (2006.01)
  *B29L 31/00*   (2006.01)
  *B29L 31/56*   (2006.01)
  *B29K 67/00*   (2006.01)

(52) U.S. Cl.
  CPC ............... *B29B 2017/0203* (2013.01); *B29B 2017/0234* (2013.01); *B29B 2017/0241* (2013.01); *B29K 2067/003* (2013.01); *B29L 2031/565* (2013.01); *B29L 2031/7158* (2013.01); *B29L 2031/744* (2013.01); *Y02W 30/622* (2015.05)

(56) References Cited

U.S. PATENT DOCUMENTS

| | | | | |
|---|---|---|---|---|
| 3,843,060 A * | 10/1974 | Colburn | ............... | B02C 18/148 241/19 |
| 3,957,631 A * | 5/1976 | Santo | ............... | B07B 1/22 209/288 |
| 4,034,862 A * | 7/1977 | Bahri | ............... | B03B 9/061 209/11 |
| 4,379,748 A * | 4/1983 | Hoogendoorn | ......... | B03B 9/061 162/55 |
| 4,915,826 A * | 4/1990 | Nordhus | ............... | B07B 1/24 209/247 |
| 5,110,055 A * | 5/1992 | Teeny | ............... | B29B 17/02 209/137 |
| 5,115,987 A * | 5/1992 | Mithal | ............... | B03B 9/061 209/11 |
| 5,236,133 A * | 8/1993 | Lundquist | ............... | B03B 9/061 241/19 |
| 5,411,142 A * | 5/1995 | Abbott | ............... | B07B 4/02 209/139.1 |
| 5,518,616 A * | 5/1996 | Previero | ............... | B03B 5/00 209/728 |
| 5,727,689 A * | 3/1998 | Anderson | ............... | B02B 1/08 209/139.1 |
| 5,732,827 A * | 3/1998 | Dorscht | ............... | B07B 1/005 209/284 |
| 6,019,227 A * | 2/2000 | May, III | ............ | A01K 67/0332 209/284 |
| 6,584,650 B1 * | 7/2003 | Pettigrew | ............... | D01G 9/02 19/200 |
| 6,892,516 B1 * | 5/2005 | Ardagna | ............... | A01B 1/00 209/421 |
| 7,824,502 B2 * | 11/2010 | Previero | ............... | B08B 9/083 134/23 |
| 7,994,448 B2 * | 8/2011 | Kenny | ............... | B03B 9/06 209/576 |
| 8,016,117 B2 * | 9/2011 | Althouse | ............... | B07B 4/02 209/139.1 |
| 8,523,093 B1 * | 9/2013 | Siladi | ............... | B29B 17/02 241/24.18 |
| 9,358,583 B1 * | 6/2016 | Kahn | ............... | B07B 1/42 |
| 2002/0144935 A1 | 10/2002 | Tims | ............... | B07B 1/02 209/235 |
| 2004/0250399 A1 * | 12/2004 | Koumura | ............... | B03B 9/061 29/403.3 |
| 2005/0051646 A1 * | 3/2005 | Horne | ............... | B02C 18/144 241/23 |
| 2011/0067569 A1 * | 3/2011 | Valerio | ............... | B07B 7/01 95/268 |
| 2011/0100882 A1 * | 5/2011 | Beam | ............... | B07B 1/005 209/252 |
| 2013/0025630 A1 * | 1/2013 | Previero | ............... | B08B 9/083 134/6 |
| 2014/0346092 A1 * | 11/2014 | Kimura | ............... | E01H 12/00 209/235 |

FOREIGN PATENT DOCUMENTS

| | | |
|---|---|---|
| JP | 2011005848 A | 1/2011 |
| KR | 20000019385 A | 4/2000 |
| KR | 100271435 B1 | 11/2000 |
| WO | 2011012113 A1 | 2/2011 |

* cited by examiner

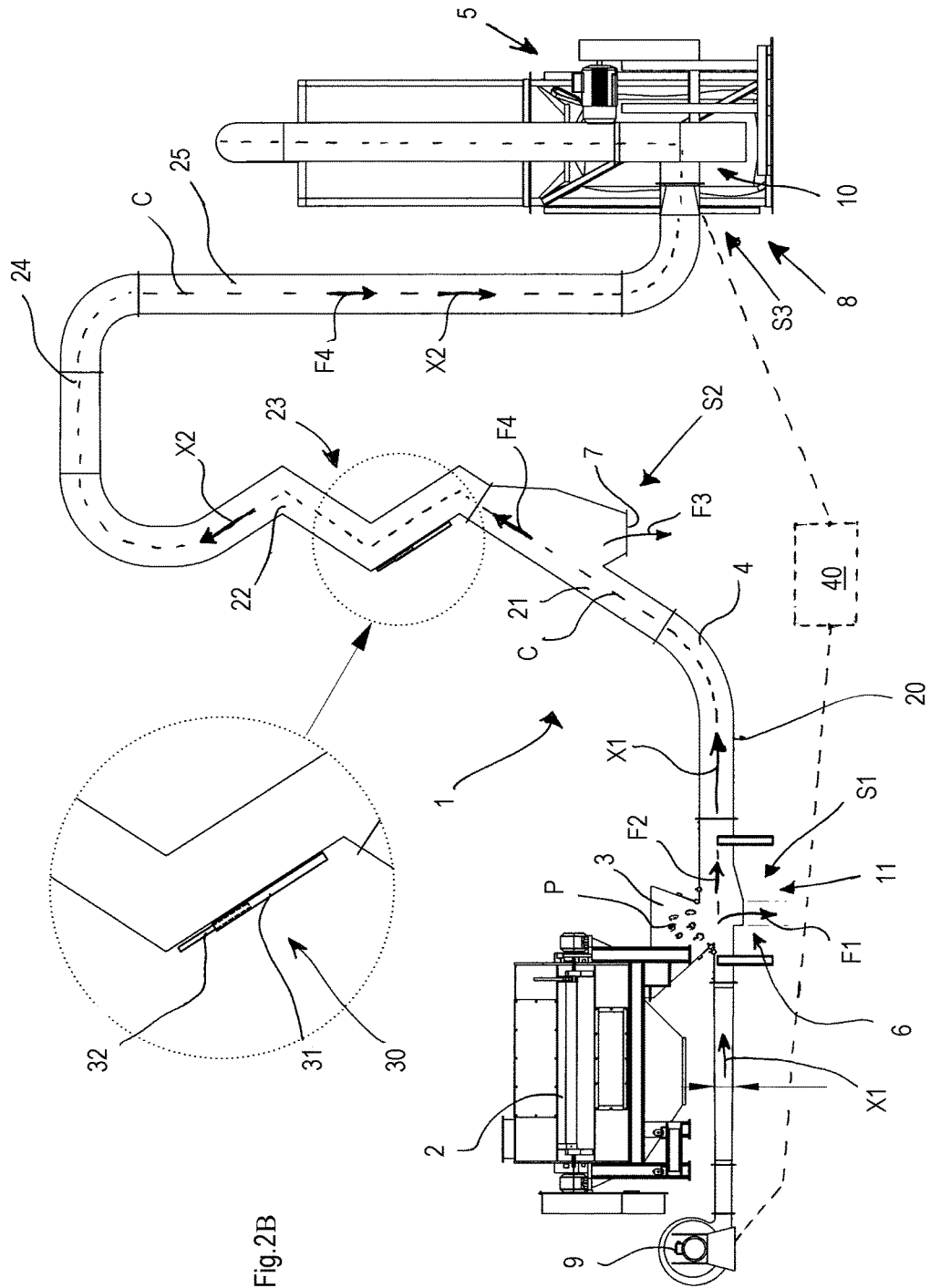

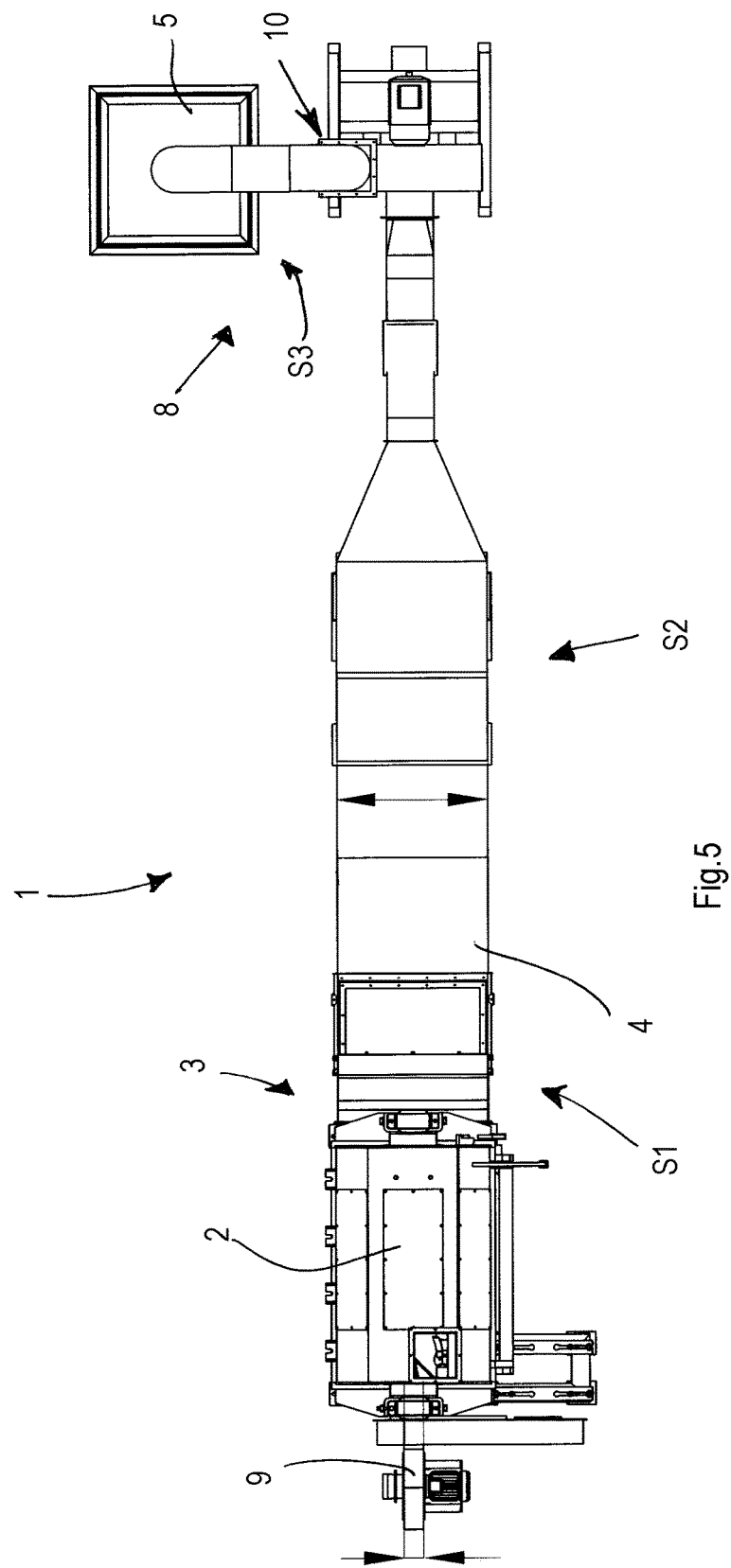

PLANT AND METHOD FOR SEPARATING LABELS AND OTHER MATERIALS FROM PLASTIC BOTTLES

FIELD OF THE INVENTION

The present invention relates to a plant and a method for separating labels, caps and other contaminating materials from bottles made of plastics, in particular bottles made of PET, in the field of treating and recycling plastics.

BACKGROUND OF THE INVENTION

Devices are known for separating labels, caps and other objects from containers made of plastics, as disclosed in documents JP2011005848, KR20000019385 and WO2011/012113.

It is known that for recycling plastics, in particular for recycling post-consumer containers or bottles made of PET, such containers or bottles are first subjected to a pre-washing step to eliminate foreign matter that has stuck to the container, and, in a subsequent step, are processed inside a rotating drum apparatus to remove labels or other bodies. Subsequently, the bottles and containers move to a subsequent grinding step in which they are reduced into flakes of small dimensions, for example of the order of a centimeter. The flakes are lastly subjected to further washing steps in order to remove contaminants and/or solid particles that have remained sticking to the flakes of plastics.

Often, the containers and bottles leaving the rotating drum apparatus and directed towards the grinding step are accompanied by fragments or labels or even entire labels or other bodies that the aforesaid apparatus was unable to separate and move totally away from the containers. Consequently, in the subsequent grinding and washing steps in addition to the containers and bottles also the aforesaid bodies and labels and other contaminating materials are found that, if they are not completely removed, can influence or even compromise the recycling material obtained. Naturally, the presence of residual contaminants beyond a certain limit leads to recovered plastics being obtained that have a degree of purity that is not industrially satisfactory. On the other hand, the need to use a large amount of washing water and chemical additives with the relative treatment costs, disposal problems and great energy consumption for heating the water are limits and weak points for which it would be desirable to intervene to obtain a general improvement in the process. There is thus still a need to seek a solution that enables labels, caps and other bodies to be separated more effectively from the bottles and containers and at the same time enable the cost and use of energy, water and additives to be reduced for washing plastics in flakes, or at least, for the same cost and amount of use of the latter, enables a purity of the recovered plastic material to be obtained that is much greater than that which is obtainable with the prior-art processes and systems that are currently in use.

SUMMARY OF THE INVENTION

An object of the present invention is to provide a method and a plant for separating labels and other materials from bottles or other containers made of plastics, by means of which it is possible to overcome the problems that are inherent in conventional treatment systems.

In particular, an object of the present invention is to improve the efficiency of separating labels, caps, inert bodies and other materials from the containers and bottles made of plastics, in particular PET, upstream of the steps of grinding into flakes and washing with water and additives, in this manner enabling greater purity in recovered plastics to be achieved.

A further object of the invention is to provide a method and a separating plant that reduce the environmental impact associated with the use of water, additives and energy consumption, also achieving economic advantages on the general process costs.

These and further objects and advantages of the invention are achievable by a plant and method having the features as described herein.

According to a first aspect of the invention, a plant is provided for separating labels, caps and other contaminating materials from containers and bottles made of plastics, in particular bottles made of PET, suitable for being positioned downstream of a rotating drum apparatus for removing said labels from the respective bottles and comprising:

collecting means for receiving products coming from said drum apparatus, conduit means extending along a conveying path and connecting said collecting means to a storing group for said labels, in which along said conduit means there are defined:

a first-stage separating unit, configured for separating from said products a first fraction containing bodies and heaviest materials of said products, and configured for allowing a second fraction of said products containing bottles and/or containers and labels to advance along said conveying path;

a second-stage separating unit configured for separating from said second fraction a third fraction of said products that comprises said bottles and/or containers, and configured for allowing a fourth fraction of said products that mainly contains said labels to advance along said conveying path, and wherein at one end of said conduit means, located downstream of said conveying path, an end-stage unit is defined for receiving and accumulating in said storing group, said fourth fraction containing said labels;

fan means positioned upstream of said first-stage separating unit and configured for generating a first air flow that is suitable for conveying said second fraction of products to said second-stage separating unit, and sucking means positioned near said third-stage separating unit and configured for generating a second air flow suitable for removing and conveying to said storing group said fourth fraction containing labels.

In a second aspect of the invention, there is provided a method for separating labels, caps and other contaminating materials from containers and bottles made of plastics, in particular bottles made of PET, comprising the steps of:

receiving in collecting means the products that exit a removing drum apparatus and consist of said labels, caps, other contaminating materials, and said containers and/or bottles made of plastics, and performing a first separating stage in which a first fraction containing bodies and heaviest materials of said products is removed from said products by gravity, generating a first air flow by fan means for advancing and conveying inside conduit means and along a conveying path, a remaining second fraction of products containing labels and bottles and/or containers;

performing a second separating stage in which from said second fraction a third fraction of said products is separated by gravity that comprises said bottles and/or containers, generating a second air flow by sucking means to remove and convey further along said conveying path a remaining fourth fraction of products that mainly contains labels performing an end stage in which said fourth fraction containing labels is received and accumulated in a storing group.

Owing to the plant and the method according to the invention, the process is improved for separating labels, caps, inert bodies and other materials from the containers and bottles made of plastics, in particular PET, so as to enable in the subsequent steps of grinding into flakes and washing with water and additives, very high purity levels to be obtained in the recovered plastics.

Further, in general the environmental impact is reduced that is associated with the use of water, additives and energy consumption, also achieving financial advantages on the general process costs.

BRIEF DESCRIPTION OF THE DRAWINGS

Further features and advantages will be clear from the following description with the help of the attached drawings that by way of non-limiting example show an embodiment of the plant according to the invention, in which:

FIG. 2A is a side view of the plant in FIG. 1;

FIG. 2B is an enlarged detail of FIG. 2;

FIG. 5 is a top view of the plant.

DETAILED DESCRIPTION OF THE INVENTION

Figure 1:
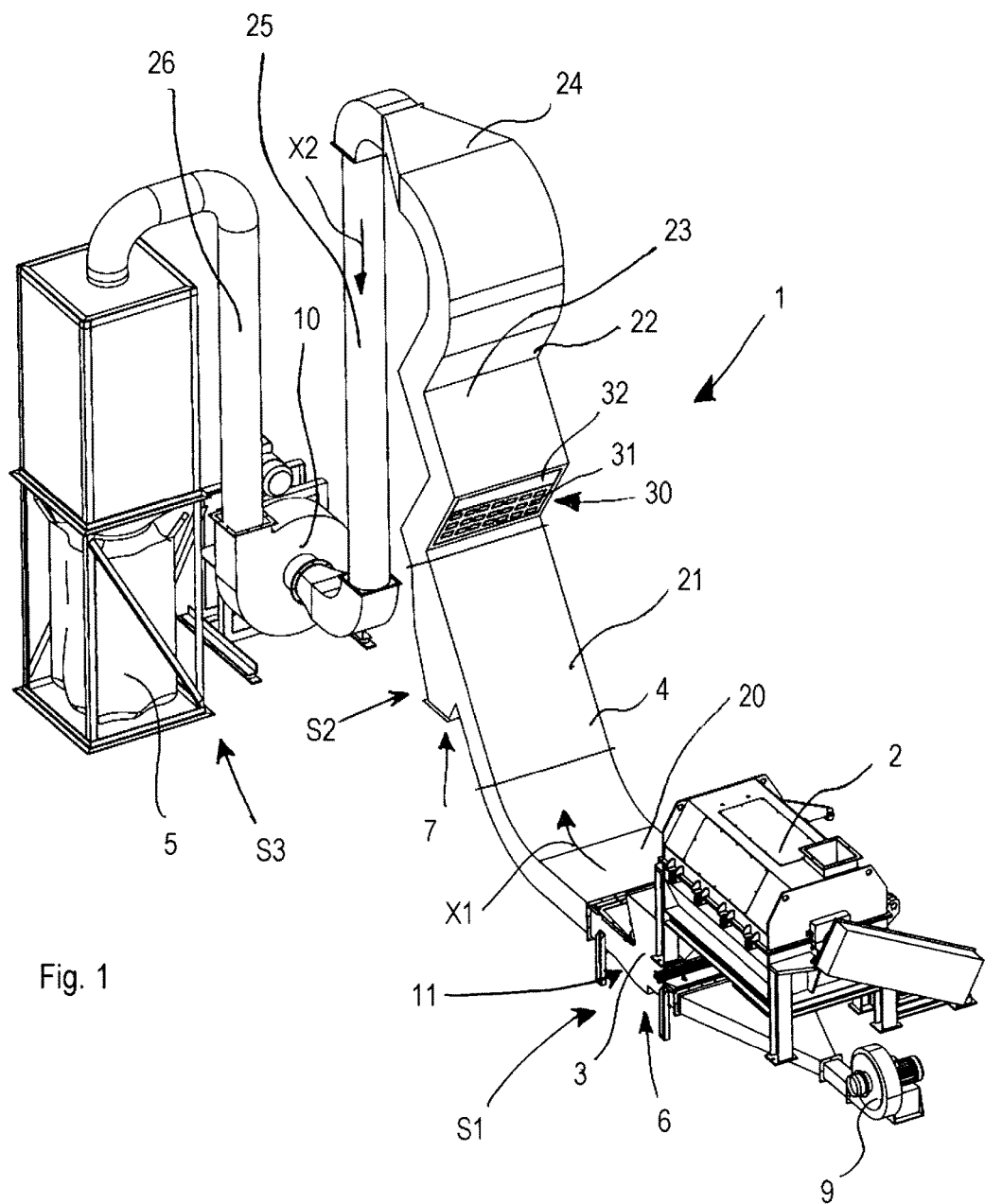
FIG. 1 is a perspective view of the plant according to the invention.
Figure 4:
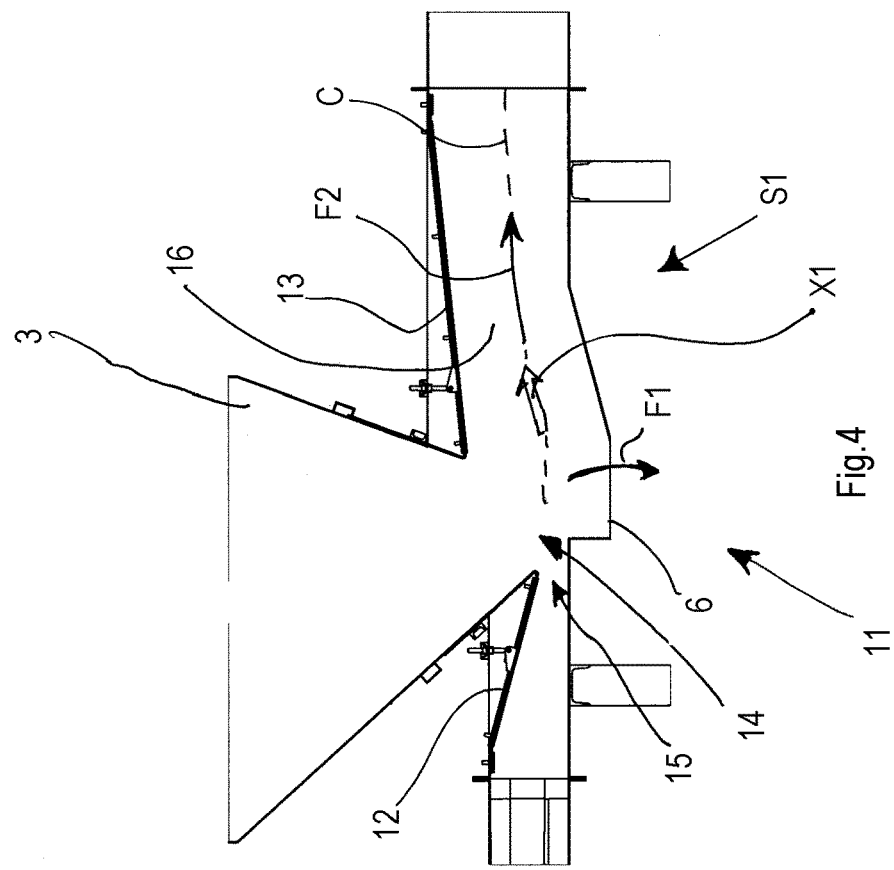
FIG. 4 is a section of a detail, taken along the line IV-IV of FIG. 3.
Figure 3:
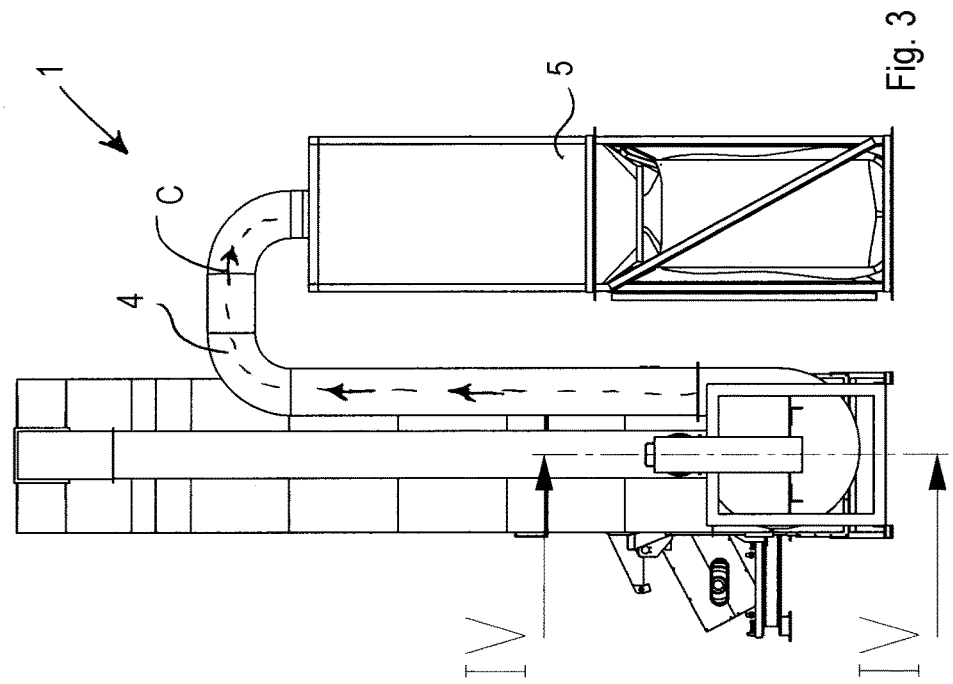
FIG. 3 is another view of the plant.

With reference to the attached Figures, there is shown a plant 1 for separating labels, caps and other contaminating materials from containers and bottles made of plastics, in particular bottles made of PET, suitable for being positioned downstream of a rotating drum apparatus 2, in particular of dry type, for removing said labels from the respective bottles. The plant 1 is thus suitable for use in the field of recovering and recycling plastics from post-consumer waste. For the purposes of the following description, the term "containers" will be generally understood to mean both bottles, receptacles and containers, made of recyclable plastics, such as PET or other; for the purposes of the following description, the term "contaminants" understood to mean both any dirt in the containers and bags of plastics or other foreign bodies mixed therewith, and possible caps and/or collars applied to the containers that, being made of material different from the material of the containers, have to be removed in order to obtain recovered plastics having the necessary purity.

The plant 1 comprises collecting means 3 for receiving products P coming from the drum apparatus 2, and conduit means 4 that extends along a conveying path C and connects the collecting means 3 to a storing group 5 for the labels. Along the conduit means 4 a first-stage separating unit S1 is defined that is configured for separating from the products P a first fraction F1 containing the bodies and heaviest materials of the products P, and configured for allowing a second fraction F2 of products that contains bottles and/or containers and labels to advance along the conveying path C. Along the conduit means 4 a second-stage separating unit S2 is also defined configured for separating from the second fraction F2 a third fraction F3 of products that comprises the bottles and/or containers, and configured for allowing a fourth fraction F4 of products that mainly contains labels to advance along the conveying path C.

At one end 8 of the conduit means 4, located downstream of the conveying path C, an end-stage unit is defined S3 for receiving and accumulating, inside the storing group 5, the fourth fraction F4 containing labels. The plant 1 comprises fan means 9 positioned upstream of the first-stage separating unit S1 and configured for generating a first air flow X1 suitable for conveying the second fraction F2 of products to the second-stage separating unit S2.

The plant 1 comprising sucking means 10 positioned near the third-stage separating unit S3 and configured for generating a second air flow X2 suitable for removing and conveying to the storing group 5 the fourth fraction F4 containing labels.

The first-stage separating unit S1 is configured for separating by gravity the first fraction F1 from the products P through a first evacuating opening 6 obtained on the conduit means 4, whereas the second-stage separating unit S2 is configured for separating by gravity the third fraction F3, comprising bottles and/or containers, from the second fraction F2 through a second evacuating opening 7 obtained on the conduit means 4. The second-stage separating unit S2 is interposed between the first-stage separating unit S1 and the end-stage unit S3. The bottles and containers that exit the second evacuating opening 7 can be transferred to a suitable station for the subsequent steps of grinding into flakes and washing.

The conduit means 4, near the first-stage unit S1, comprise a first conduit portion 11 with a variable section, that includes a chamber with a converging zone, configured for accelerating the first air flow X1 near the collecting means 3, and, further downstream, an expanding zone for the first air flow X1. The first evacuating opening 6 is obtained on a lower part of the first conduit portion 11 having variable section.

The first conduit portion 11 with variable section is shaped for obtaining a Venturi effect, and comprises adjustable wall means 12, 13, shaped for deflecting and guiding the first air flow X1. The position of the adjustable wall means 12, 13 can be adjusted for varying fluid-dynamic parameters of the first air flow X1, such as speed and pressure, so as to subject the second fraction F2 of products to a desired thrusting and dragging action along the conveying path C.

The collecting means comprises in particular a hopper element 3 in the lower part of which there is obtained a discharge opening 14 for the products P coming from the drum apparatus 2.

The adjustable wall means 12, 13 comprise a deflecting wall 12, located upstream of the aforesaid discharge opening 14, and delimiting, on one side, an outflow port 15 for the flow of air coming from the fan means 9. The position of the deflecting wall 12 is adjustable to vary the passage section of the outflow port 15 for the aforesaid flow of air.

The adjustable wall means further comprises a guiding wall 13, located downstream of the discharge opening 14 and delimiting, on one side, a reception and channelling zone 16 for the first air flow X1. The position of the guiding wall 13 is adjustable to vary the inlet section and/or the geometrical conformation of the reception and channelling zone 16 for the first air flow X1.

The deflecting wall 12 and/or the guiding wall 13 are rotatably adjustable to vary the tilt thereof with respect to the conveying path C.

The conduit means 4 has a cross-section profile that is geometrically shaped to obtain laminar regime fluid-dynamic conditions for the first air flow X1 so as to promote a floating action for the bottles and/or containers inside the first air flow X1. In particular, between the first-stage unit S1 and the second-stage unit S2, the conduit section has a rectangular profile that enables, during conveying, even distribution of the bottles to be maintained and the latter to be maintained raised and separated by, i.e. not in contact with, the lower walls of the conduits. The labels and the other light bodies are thus preventing from remaining trapped between the bottles and the walls of the conduits and are dragged and evacuated into the second separating stage S2 together with the bottles.

The conduit means 4 comprises, downstream of the first-stage separating unit S1, a substantially horizontal first conduit segment 20, to which a second conduit segment 21 is connected further downstream that extends in a tilted manner upwards with a progressively increasing height along the conveying path C. The conduit means 4 comprises, downstream of the second conduit segment 21, a third conduit segment 22 that extends further upwards. The second-stage separating unit S2 is defined straddling the second conduit segment 21 and the third conduit segment 22.

On the third conduit segment 22, near the second-stage separating unit S2, an air intake 30 opening is obtained that is configured for enabling the sucking means 10 to suck air from the outside to the inside of the conduit means 4 for generating the second air flow X2 downstream of the second-stage unit S2.

The air intake 30 opening can comprise a pierced plate 31 with which a movable port element 32 is coupled, for example slidably, to close in a desired manner the air intake 30 opening, so as to control the quantity of air sucked through the air intake 30.

In the second-stage unit S2 a manifold portion 19 is provided with a shape that is tapered downwards, on which the second evacuating opening 7 is obtained below for the third fraction F3 of products that comprises bottles and containers.

The third conduit segment 22 comprises a zigzag part 23, suitable for hindering a possible advancement of bottles and/or containers to said storing group 5.

The conduit means 4 comprises a fourth conduit segment 24 that in part extends horizontally at a maximum height, and subsequently, a fifth conduit segment 25 that descends by extending downwards as far as said sucking means 10, an end conduit 26 being lastly provided that connects the sucking means 10 to the storing group 5.

The fan means 9 and the part of the conduit means 4 that is comprised between the first-stage unit S1 and the second-stage unit S2, are configured so that the first air flow X1 is such as to give the bottles and containers of said second fraction F2 a kinetic energy and a thrust sufficient to enable the bottles and containers to reach but not go past the second-stage unit S2 so as to subsequently fall and exit through second evacuating opening 7.

The sucking means 10 and the further part of the conduit means 4, that is comprised between the second-stage unit S2 and the end-stage unit 3, are configured so that the second flow X2 is unable to act on the bottles and containers to attract and drag the bottles and containers further along the conveying path but is on the other hand sufficient to attract and drag only the fourth fraction F4 containing labels to the storing group 5.

The plant comprises a control unit 40 operationally connected to, and configured for controlling the driving speed of the fan means 9 and of the sucking means 10 for obtaining determined fluid-dynamic parameters of the first X1 and second X2 flow of air on the basis of specific process needs and/or on the basis of the types and features of the products P to be processed.

From what has been said and shown in the attached drawings it will thus have been understood that in addition to the plant a method has also been provided for separating labels, caps and other contaminating materials from containers and bottles made of plastics, in particular bottles made of PET, comprising the steps of:

receiving in the collecting means 3 the products P that exit the removing drum apparatus 2 and that include labels, caps, other contaminating materials, containers and/o bottles made of plastics, and performing a first separating stage in which a first fraction F1 is removed from the products P by the force of gravity that contains the bodies and heaviest materials of the products P, generating a first air flow X1 by fan means 9 for advancing and conveying, inside the conduit means 4 and along the conveying path C, a remaining second fraction F2 of the products containing labels and bottles and/or containers;

performing a second separating stage S2 in which a third fraction F3 of the products that comprises bottles and/or containers is separated by the force of gravity from the second fraction F2;

generating a second air flow X2 by the sucking means 10 to remove and convey further along the conveying path C a remaining fourth fraction F4 of the products that mainly contains labels and performing an end stage S3 in which the fourth fraction F4 containing labels is received and accumulated in the storing group 5.

The method and the plant disclosed above, enable very high purity levels to be obtained in the recovered plastics and the use of water, additives and electric energy to be reduced in the subsequent steps of the recycling process by virtue of the increased separating efficiency of the plant 1 and method of the invention, thus achieving advantages also on the financial level.

The object is thus achieved of providing a solution that reduces the general processing cost and at the same time achieves more cheaply and simply very great efficiency in separating the various materials in the recycling process.

It is understood that what has been said and shown with reference to the attached drawings has been provided merely by way of illustration of the general features of the separating method and plant according to the present invention; thus other amendments or variations can be made to the method, to the entire system or to parts thereof without thereby falling outside the scope of the claims. In particular, the geometrical conformation, dimensions, position and materials that make up one or more parts of the plant can be chosen and/or optimised to suit specific operational requirements.

The invention claimed is:

1. A plant for separating labels, caps and other contaminating materials from containers and bottles made of plastics, suitable for being positioned downstream of a rotating drum apparatus for removing said labels from the respective bottles, comprising:
- a collector for receiving products coming from said drum apparatus, a conduit extending along a conveying path and connecting said collector to a storing group for said labels, along said conduit there are defined:
  - a first-stage separating unit, configured for separating from said products a first fraction containing bodies and heaviest materials of said products, and configured for allowing a second fraction of said products containing bottles and/or containers and labels to advance along said conveying path;
  - a second-stage separating unit configured for separating from said second fraction a third fraction of said products that comprises said bottles and/or containers, and configured for allowing a fourth fraction of said products that mainly contains said labels to advance along said conveying path; and wherein
- at one end of said conduit, located downstream of said conveying path, there is defined an end-stage unit for receiving and accumulating, in said storing group, said fourth fraction containing said labels;
- a fan positioned upstream of said first-stage separating unit and configured for generating a first air flow suitable for conveying said second fraction of products to said second-stage separating unit;
- a suction apparatus positioned near said end-stage unit and configured for generating a second air flow suitable for taking and conveying to said storing group said fourth fraction containing labels;
- said conduit including a first conduit portion near said first-stage separating unit having a variable section with a chamber having a converging zone with a first adjustable wall configured for accelerating said first air flow near said collector according to a Venturi effect, and the chamber also having an expanding zone with a second adjustable wall disposed downstream of said first adjustable wall; and
- the position of said first adjustable wall can be adjusted for varying fluid-dynamic parameters of said first air flow, such as speed and pressure, so as to subject said second fraction of products to a desired thrusting and dragging action along said conveying path.

2. The plant according to claim 1, wherein said first-stage separating unit is configured for separating by gravity said first fraction from said products through a first evacuating opening obtained on said conduit, and wherein said second-stage separating unit is configured for separating by gravity said third fraction, comprising bottles and/or containers, from said second fraction through a second evacuation opening obtained on said conduit, said second-stage separating unit being interposed between said first-stage separating unit and said end-stage unit.

3. The plant according to claim 1, wherein said adjustable wall comprises a deflecting wall, located upstream of a discharge opening of said collector, that delimits, on one side, an outflow port for the flow of air coming from said fan, the position of said deflecting wall being adjustable to vary the passage section of said outflow port for said flow of air.

4. The plant according to claim 1, wherein said adjustable wall comprises a guiding wall, located downstream of the discharge opening of said collector and delimiting, on one side, a reception and channelling zone for said first air flow, the position of said guiding wall being adjustable to vary the inlet section and/or the geometrical conformation of said reception and channelling zone for said first air flow.

5. The plant according to claim 3, wherein said deflecting wall and/or said guiding wall are rotatably adjustable to vary the tilt thereof with respect to said conveying path.

6. The plant according to claim 1, wherein said first-stage separating unit is configured for separating by gravity said first fraction from said products through a first evacuating opening obtained on said conduit, and wherein said second-stage separating unit is configured for separating by gravity said third fraction, comprising bottles and/or containers, from said second fraction through a second evacuation opening obtained on said conduit, said second-stage separating unit being interposed between said first-stage separating unit and said end-stage unit, and wherein said first evacuating opening is placed below said first conduit portion with a variable section, and wherein said collector comprises a hopper element suitable for receiving products exiting said drum apparatus.

7. The plant according to claim 1, wherein said conduit have a cross-section profile that is geometrically shaped to obtain laminar fluid-dynamic operating conditions for said first air flow so as to promote a floating action for said bottles and/or said containers inside said first air flow.

8. The plant according to claim 1, wherein said conduit comprises, downstream of said first-stage separating unit, a first, substantially horizontal, conduit segment, to which, further downstream, a second conduit segment is connected that extends in a tilted manner upwards at a progressively increasing height along said conveying path, and wherein said conduit comprises, downstream of said second conduit segment, a third conduit segment that extends further upwards, said second-stage separating unit being defined astride said second conduit segment and said third conduit segment.

9. The plant according to claim 8, wherein on said third conduit segment, near said second-stage separating unit, an air intake opening is obtained that is configured for enabling said suction apparatus to suck air from the outside to the inside of said conduit to generate said second air flow downstream of said second stage unit.

10. The plant according to claim 9, wherein said air intake opening comprises a pierced plate with which a port element is coupled that is movable for closing to a desired extent said air intake opening, so as to control the quantity of air sucked through said air intake.

11. The plant according to claim 1, wherein in said second stage unit a manifold portion is provided with a shape that is tapered downwards, on which said second evacuation opening is below obtained for said third fraction comprising bottles and containers.

12. The plant according to claim 8, wherein said third conduit segment comprises a zigzag part, suitable for hindering a possible advancement of bottles and/or containers to said storing group.

13. The plant according to claim 8, wherein said conduit further comprises:
- a fourth conduit segment that in part extends horizontally at a maximum height,
- a fifth conduit segment that descends by extending downwards as far as said suction apparatus, and
- an end conduit section that connects said suction apparatus to said storing group.

14. The plant according to claim 1, wherein said first-stage separating unit is configured for separating by gravity said first fraction from said products through a first evacuating opening obtained on said conduit, and wherein said second-stage separating unit is configured for separating by gravity said third fraction, comprising bottles and/or containers, from said second fraction through a second evacuation opening obtained on said conduit, said second-stage separating unit being interposed between said first-stage separating unit and said end-stage unit, and wherein said fan and the part of said conduit that is comprised between said first-stage unit and said second stage unit, are configured so that said first air flow is such as to give to the bottles and containers of said second fraction a kinetic energy and a thrust sufficient to enable the bottles and containers to reach but not go past said second stage unit so as to subsequently fall and exit through said second evacuation opening, and wherein said suction apparatus and the further part of said conduit, that is comprised between said second stage unit and said end stage unit, are configured in such a manner that said second flow is not able to act on said bottles and containers to attract and drag the bottles and containers further along the conveying path but is on the other hand sufficient to attract and drag only the fourth fraction containing labels towards said storing group.

15. The plant according to claim 1, further comprising a control unit operationally connected to, and configured for controlling the driving speed of, said fan and said suction apparatus for obtaining determined fluid-dynamic parameters of said first air flow and said second air flow on the basis of specific process needs and/or on the basis of the types and characteristics of said products.

16. A method for separating labels, caps and other contaminating materials from containers and bottles made of plastics, comprising the steps of:
receiving in a collector the products that exit a removing drum apparatus and that consist of said labels, caps, other containing materials and said containers and/or bottles made of plastics; and
performing a first separating stage in which from said products a first fraction containing bodies and heaviest materials of said products is removed by gravity;
generating a first air flow for advancing and conveying, inside a conduit and along a conveying path, a remaining second fraction of the products containing labels and bottles and/or containers, including accelerating the first air flow through a converging zone of a chamber of a first conduit portion of the conduit, and including directing the first air flow through an expanding zone of the chamber of the first conduit portion;
performing a second separating stage in which from said second fraction a third fraction is separated of said products that comprises said bottles and/or containers;
generating a second air flow for removing and further conveying along said conveying path a remaining fourth fraction of the products that prevalently contains labels; and
performing an end stage in which said fourth fraction containing labels is received and accumulated in a storing group.

17. The method according to claim 16, wherein the first separating stage occurs by evacuating by gravity said first fraction through a first evacuating opening of said conduit, and wherein the second separating stage is subsequent to said first stage and occurs by evacuating by gravity said third fraction, comprising bottles and/or containers, through a second evacuation opening obtained on said conduit, wherein said end stage for receiving and accumulating labels occurs subsequently to said second separating stage, and wherein a Venturi-type effect is generated to vary the speed and pressure of the first air flow along said conveying path near said first evacuating opening, accelerating, by zones with a cross section that is progressively reduced, and subsequently slowing said first air flow by advancing it through an expanding zone with a progressively increasing section.

18. The method according to claim 16, wherein fluid-dynamic parameters of said first air flow, are controlled, so as to subject said second fraction of products to a desired thrusting and dragging action along said conveying path, wherein the cross section of said conduit is configured for the passage of said first flow of air to obtain laminar operating fluid-dynamic conditions for said first air flow so as to promote a floating action for said bottles and/or said containers inside said first air flow, and wherein advancing said first air flow is provided first along a first, substantially horizontal conduit segment, and subsequently along a second conduit segment that extends in a tilted manner upwards at a progressively increasing height along said conveying path, and wherein said second flow is advanced, starting from an air intake zone for sucking air from the outside, along a third conduit segment that extends further upwards, partly with a zigzag part, to hinder any further advancement of bottles and/or containers, and wherein said second flow is subsequently advanced through a fourth conduit segment that partially extends horizontally at a maximum height, and subsequently, through a fifth conduit segment that descends by extending downwards as far as said suction apparatus.

19. The method according to claim 16, wherein the fan is driven and controlled and the conduit is configured for obtaining fluid-dynamic conditions of said first air flow so as to give the bottles and containers of said second fraction a kinetic energy and a thrust that are sufficient to reach but not exceed the second evacuation opening, so as to cause the exit and fall of said containers and/or bottles, and wherein said suction apparatus is driven and controlled and the downstream part of said conduit is configured to obtain respective fluid-dynamic conditions, such that said second air flow is not able to act on said bottles and containers to attract and drag said bottles and containers further along the conveying path but is on the other hand sufficient to attract and drag only the fourth fraction containing labels to said storing group.

20. The method according to claim 16, wherein the driving speed of said fan and of said suction apparatus is controlled by a control unit that is operationally connected thereto, to obtain determined fluid-dynamic parameters of said first flow of air and of said second air flow on the basis of specific process needs and/or on the basis of types and features of said products.

* * * * *